United States Patent [19]

Safonnikov et al.

[11] 4,207,454
[45] Jun. 10, 1980

[54] METHOD FOR ELECTROSLAG WELDING OF METALS

[75] Inventors: Anatoly N. Safonnikov; Anatoly G. Sinchuk; Anatoly V. Antonov, all of Kiev, U.S.S.R.

[73] Assignee: Institut Elektrosvarki Imeni E.O. Patona Akademii Nauk Ukrainskoi SSR, Kiev, U.S.S.R.

[21] Appl. No.: 912,104

[22] Filed: Jun. 2, 1978

[30] Foreign Application Priority Data

Jun. 6, 1977 [SU] U.S.S.R. .......................... 2495515[I]

[51] Int. Cl.² .................. B23K 9/18; B23K 25/00
[52] U.S. Cl. .................................. 219/73.1; 219/137 R
[58] Field of Search ............... 219/73.1, 137.2, 137 R

[56] References Cited

U.S. PATENT DOCUMENTS

| 3,585,343 | 6/1971 | Crichton | 219/73.1 |
| 3,636,301 | 1/1972 | Ischenko et al. | 219/73.1 X |
| 3,885,121 | 5/1975 | Dupko et al. | 219/73.1 |
| 4,153,832 | 5/1979 | Iio et al. | 219/73.1 X |

FOREIGN PATENT DOCUMENTS

1917861 11/1969 Fed. Rep. of Germany .
207703 11/1968 U.S.S.R. .

Primary Examiner—B. A. Reynolds
Assistant Examiner—Keith E. George
Attorney, Agent, or Firm—Haseltine, Lake & Waters

[57] ABSTRACT

A method for electroslag welding of metals whose density is less than that of welding fluxes, is provided. The method is based on floating-up of drops of molten metal of the edges being welded and of the electrode in a slag whose density exceeds that of the metal. The floating-up metal drops form a metal bath on the surface of the slag bath, and crystallization of the metal bath produces a weld. In the course of welding, the electrode metal is fed into the slag bath in the upward direction, while the electrode metal melts and the weld is built up in the downward direction.

11 Claims, 14 Drawing Figures

METHOD FOR ELECTROSLAG WELDING OF METALS

BACKGROUND OF THE INVENTION

1. Field of the Application

The present invention relates to the field of welding engineering, and more specifically, to methods for electroslag welding of structural elements with large weld areas, particularly with a weld thickness of over 30 mm.

The invention is readily adapted for application in welding light metals (the term "light metals" is used herein to denote metals the density of which is less than that of fluxes used for their welding). In particular, the invention may be effectively employed in chemical, metallurgical, electrical-engineering and other enterprises in welding large cross-section elements of aluminum, titanium, copper, and alloys thereof, as well as of magnesium alloys and of various steels.

There is a trend nowadays for intensifying production processes by increasing the capacities of individual units which is also characteristic for production of aluminum, chlorine, and other products by electrolytic processes, where a need for considerably increasing the process current thus arises. This involves employing large-size aluminum buses with a metal thickness as great as 160 mm and more as current conducting elements. In this case the quality of welded contacts is of prime importance. A similar situation is also typical for structures of other metals and in other fields of engineering.

As a consequence, large-thickness metal finds an ever increasing application in manufacturing welded structures.

It is well known that aluminum, magnesium, alloys thereof, and other metals of a large thickness are at present welded using various multipass arc welding methods. However, the efficiency of welding and the quality of welded joints fall drastically as the thickness of the metal being welded is increased. This stems from an unavoidable necessity of dressing every built-up layer before the next pass. Moreover, multipass welding necessitates turning over many times the elements being welded in order to retain the geometrical shape thereof. And, finally, the use of said methods leads in most cases to anisotropy of the weld metal properties.

This has created an acute problem of welding large-thickness structural elements of such metals as magnesium, aluminum, alloys thereof, and other metals with provision for both high efficiency of welding and high quality of welded joints.

This problem could be adequately solved by a prior-art method of electroslag welding (cf., e.g. U.S. Pat. No. 3,885,121 and F.R.G. Pat. No. 1,917,861). The method of electroslag welding of metals is generally implemented with the aid of a molding means comprising an inlet pocket for starting the welding process, withdrawal plates for withdrawing a shrinkage cavity and a slag both from the gap, and side molds. The pocket for starting the process is arranged beneath the gap defined by the edges being welded, and the withdrawal plates, above the gap. A slag bath is established in the pocket, which is followed by feeding therein an electrode material in the downward direction. Molten metal descending onto the bottom of the slag bath, forms the weld in the upward direction. The electrode is melted by the heat of the slag bath through which the welding current is passed.

The prior-art electroslag welding methods are, however, applicable only for metals whose density greatly exceeds that of the welding flux, and are unfit for welding light metals due to the fact that in this case molten metal is less dense than slag and floats therefore to the surface of the slag bath. This upsets the stability of the process, is accompanied by shorting the welding circuit and other adverse effects. This is especially encountered in electroslag welding of aluminum and its alloys, whose density differs but little from that of welding fluxes, while such metals as magnesium and its alloys altogether fail to be welded by prior-art electroslag welding methods.

The principal object of the invention is to provide a method for electroslag welding of light metals, i.e. metals whose density is less than that of the welding flux.

One more object of the invention is to provide a method for electroslag welding of light metals, which ensures stable run of the process, high quality and operating reliability of weld joints.

Another object of the invention is to enhance the efficiency of welding light metals.

Still another object of the invention is to provide a method for electroslag welding of various type structural units whose element edges to be welded are substantially of any cross-section and configuration.

A further object of the invention is to provide a method for electroslag welding in the downward direction.

Still further object of the invention is to provide a method for electroslag welding of light-metal structures with a restricted access thereto from above for carrying out mounting jobs.

SUMMARY OF THE INVENTION

The above and other objects are attained in a method for electroslag welding of metals, comprising forming the slag bath wherein an electrode is subsequently melted by the head produced by passing welding current through the liquid slag, in which, according to the invention, the slag bath is formed from the welding flux whose density is higher than that of a metal to be welded and the welding is effected in the downward direction with formation above the slag bath of a metal bath which is protected from the effect of the atmosphere.

Implementing the method in this manner makes it possible to effect electroslag welding of light metals, such as magnesium and its alloys, whose density is less than that of welding fluxes, with high efficiency and high quality.

In electroslag welding of light metals, it is expedient to install the electrode fixedly in the gap defined by the edges being welded, to fill the gap with welding fluxes, and to start the welding process by establishing a slag bath in the region of the electrode top portion, with the volume of electrode being selected equal to that of the space confined by the edges being welded.

This provides for welding curvilinear joints using a fixed consumable electrode whose shape corresponds to the gap profile. Besides, the apparatus for the method is simplified, as this involves no feeding means.

Welding can be effected by feeding a consumable electrode in the upward direction in the gap between the edges being welded. This technique for implementing the method broadens the production-process poten= tialities of welding; it makes possible, for example, electroslag welding of structural units inaccessible from the top, which facilitates mounting jobs.

It is advisable to remove the excess volume of slag from the gap between the edges being welded. This will simplify the apparatus for implementing the method in welding short-length joints.

It is useful to move the slag bath in the downward direction in the course of welding, which enables long straightliner joints to be welded, retaining substantially constant and required volume of the slag bath and, in addition, saves welding materials.

It is reasonable to place a consumable welding electrode in the gap defined by the edges being welded and then fill the gap with welding flux containing finely divided added metal.

This allows welding joints with a lower consumption of electrode material and, in addition, alloying the weld metal by incorporating alloying elements into the flux composition.

It is appropriate to fixedly install a consumable nozzle in the gap between the edges to be welded and to feed the electrode into the slag bath through this nozzle which allows welding current to be fed to the electrode in the form of a wire, being in the slag bath thereby saving electric power.

It is practicable to install a fixed nonconsumable nozzle in the gap between the edges to be welded and to feed the electrode into the slag bath therethrough, which provides for an intense heat removal in the course of welding the elements, which ensures a complete fusion of the edges being welded.

It is feasible to install in the gap between the edges being welded a non-consumable electrode and to feed into the slag bath an added material from outside the welding circuit, which, depending on the added material, makes it possible either to improve the efficiency of the welding process or to alloy the weld.

It is possible to fill the gap defined by the edges being welded with welding flux and to start the process by pouring some amount of liquid slag over the welding flux. This simplifies starting the electroslag process owing to elimination of additional means for establishing the slag bath.

It is advisable that the slag density at any given welding temperature be selected in compliance with the relationship $$\gamma_{slag} = \frac{100}{\Sigma \frac{k_i}{\gamma_i}} > \gamma_m,$$

where:

$\gamma_{slag}$ = density of slag:
$k_i$ = percentage content of flux components;
$\gamma_i$ = density of flux components.
$\gamma_m$ = density of the metal This allows proper selection of flux for welding the metal in question.

BRIEF DESCRIPTION OF THE DRAWINGS

The above-mentioned and other objects of the invention will become more apparent from the following detailed description of examples of the method for electroslag welding of metals whose density is less than that of welding fluxes, taken in conjunction with the accompanying drawings, wherein the same parts are designated by the same reference numerals and wherein.

DESCRIPTION OF PREFERRED
EMBODIMENTS OF THE INVENTION

There is provided a method for electroslag welding of light metals, i.e. metals whose density is less than that of welding fluxes.

Figure 1:
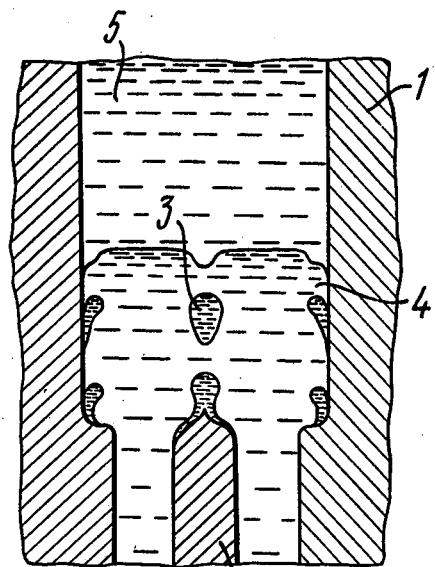
FIG. 1 is a schematic diagram of electroslag welding of metals whose density is less than that of welding fluxes, according to the invention.

The method is in principle based on melting the edges being welded of elements 1 (FIG. 1) and an electrode 2, floating of molten metal drops 3 upwards in a slag 4 having a higher density, with formation of a metal bath 5 on the surface of the slag and building-up of the weld in the downward direction, i.e. from top to bottom.

Figure 2:
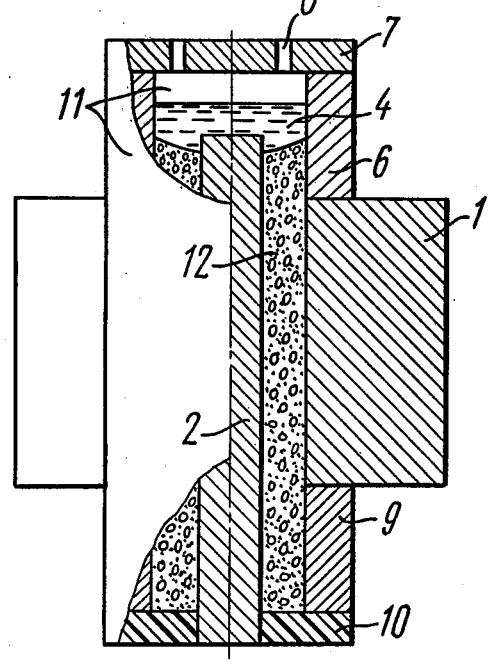
FIG. 2 illustrates an example of the welding with a stationary arrangement of the bottom plate and of a consumable plate electrode, beginning of the process.

Said method is implemented with the aid of a molding means which comprises an inlet pocket 6 (FIG. 2) whose cover 7 is provided with holes 8 for feeding a protective gas, withdrawal plates 9, a bottom plate 10, and side molds 11.

The gap defined by the edges of the elements 1 being welded is embraced by the molding means, which is accomplished by placing the inlet pocket 6 onto the elements 1 being welded, above the gap; the withdrawal plates 9, beneath the gap; and the molds 11, at the two sides of the gap. The bottom plate 10 serves to retain the welding bath, i.e. the slag bath and the metal bath. The electrode 2 is placed in the gap defined by the edges being welded. A welding current source (not shown) is connected to the inlet pocket 6 and to the electrode 2. The slag bath 4 is established in the inlet pocket 6, with the result that welding current flows through the slag bath. Acted upon by welding current, the slag bath 4 heats up vigorously and melts the edges being welded of elements 1 and the electrode 2. The molten metal drops 3 float up in the slag 4, whose density exceeds that of the metal, to form the metal bath 5 on the slag surface. In the course of welding, the welding electrode 2 is melted off in the downward direction, i.e. from top to bottom, and the weld is built up also in the direction from top to bottom. The metal bath 5 is protected from being exposed to the atmosphere by feeding protective gases to its surface.

The above-described method provides for highly efficient and high-quality welding of light metals.

Figure 4:
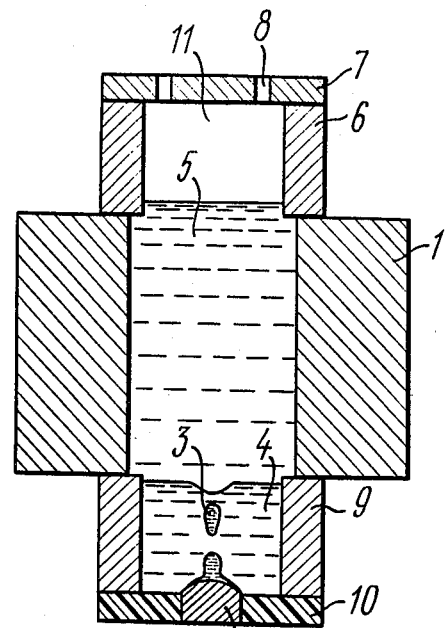
FIG. 4 is the same as in FIGS. 2 and 3, but illustrating the end of the welding process.
Figure 3:
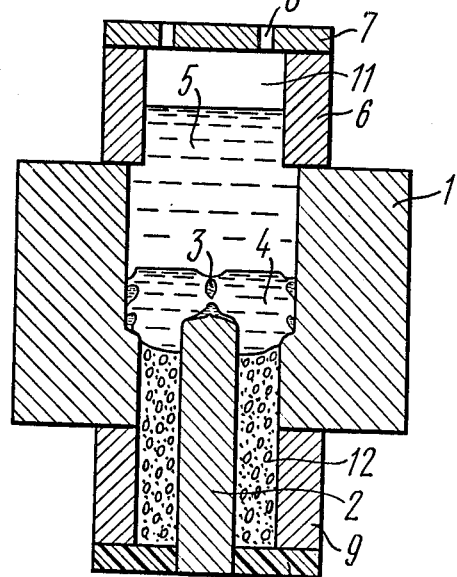
FIG. 3 is the same as in FIG. 2, but illustrating a steady-state (stable) process.

In accordance with an embodiment of the invention, the bottom plate 10 (FIG. 2) of the molding means is placed stationary beneath the withdrawal plates 9. The electrode 2 is fixedly installed in the gap defined by the edges being welded of the elements 1. The gap is filled with a welding flux 12. The volume of the electrode material 2 is selected equal to that of the space confined by the edges to be welded of the elements 1 and by the molding means elements, and the volume of the welding flux 12 is selected so that after melting and crystallization, with allowance made for shrinkage, it fills the space between the withdrawal plates 9. A welding current source (not shown) is connected to the welding electrode 2 and to the inlet pocket 6. The welding process is started by establishing the slag bath 4 in the region of the top portion of the electrode 2. Welding current flowing through the established slag bath 4 heats it up vigorously, with the result that the edges being welded of the elements 1 and the electrode 2 are melted. The molten metal drops 3 (FIG. 3) float up in the slag 4, whose density exceeds that of the metal, to form on the slag surface the metal bath 5 which crystallizes to build up the weld. Inasmuch as the volume of the selected electrode equals that of the gap, the latter becomes completely filled with the molten metal 5. When the process is completed, the metal bath 5 (FIG. 4) is retained at the required level in the gap by the slag bath 4 whose volume corresponds to the volume confined by the withdrawal plates 9 and by the molds 11. This embodiment of the invention is expedient in welding not too long curvilinear joints; in this case, the welding electrode is shaped so as to correspond the gap profile.

Figure 9:
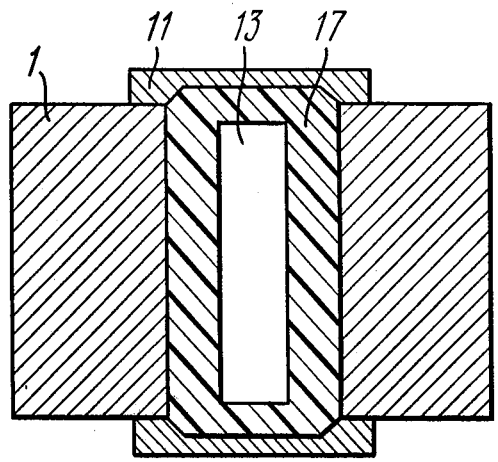
FIG. 9 is a sectional view taken along the line IX—IX in FIG. 7 and illustrating the bottom plate with a through aperture for feeding a plate electrode therethrough, the welding electrode not being shown.
Figure 10:
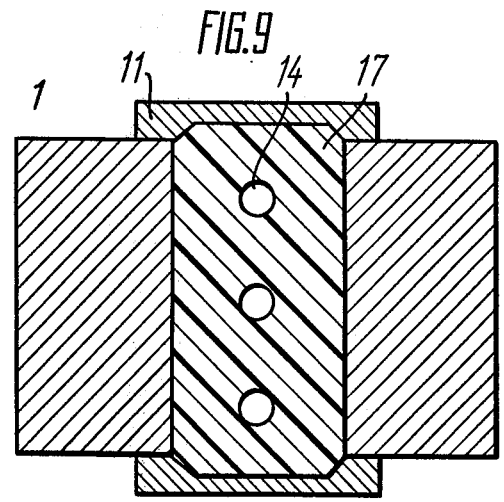
FIG. 10 is the same as in FIG. 9, but for the case of feeding wire electrodes through the bottom plate, the welding electrode being not shown.

In accordance with another embodiment of the invention, welding is effected by feeding a consumable electrode through an aperture provided in the bottom plate. The electrodes may be of various shapes, the aperture in the bottom plate being shaped correspondingly; thus, a rectangular aperture 13 (FIG. 9) is provided in the bottom plate 10 for welding with a plate electrode, and round apertures 14 (FIG. 10), in welding with a wire electrode.

Figure 5:
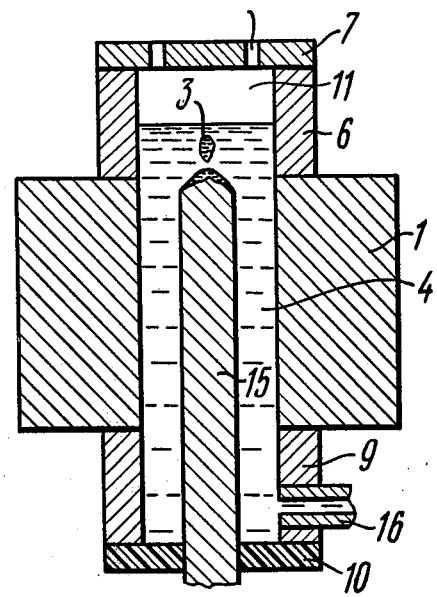
FIG. 5 illustrates an example of the welding with a stationary arrangement of the bottom plate and a consumable plate electrode fed therethrough, beginning of the process.
Figure 6:
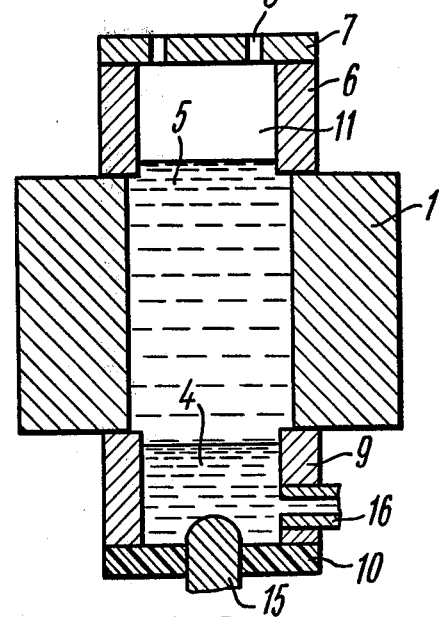
FIG. 6 is the same as in FIG. 5, but illustrating the end of the process.
Figure 7:
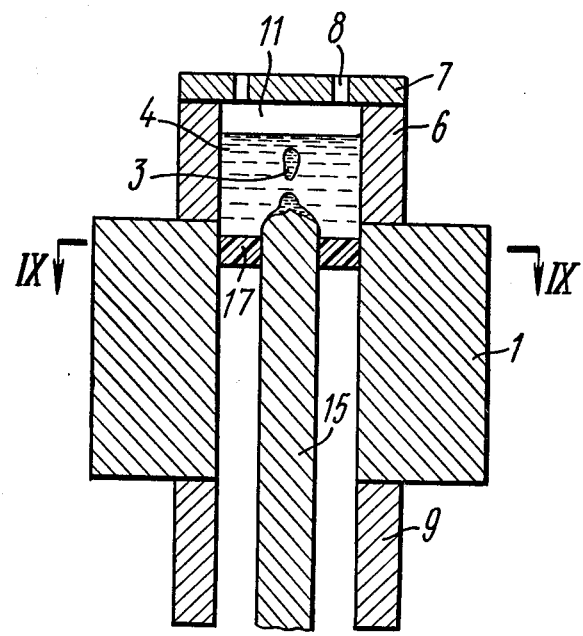
FIG. 7 illustrates an example of the welding with the bottom plate installed for vertical movement in the gap defined by the edges being welded and with a consumable plate electrode fed through an aperture provided in the bottom plate, beginning of the process.
Figure 8:
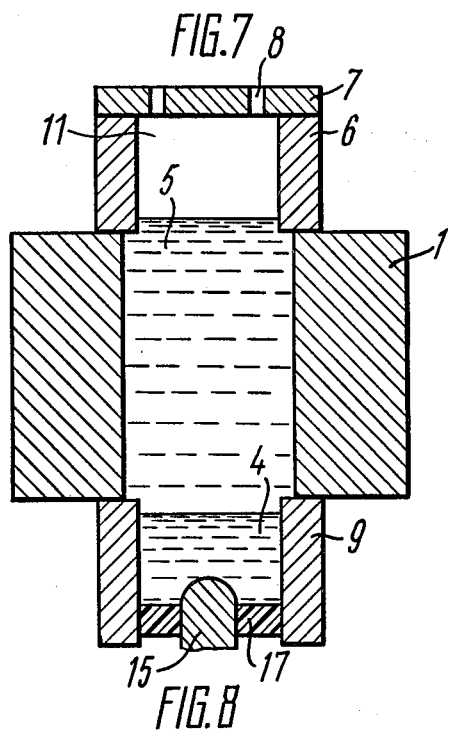
FIG. 8 is the same as in FIG. 7, but illustrating the end of the process.

When implementing the method in this manner, the bottom plate may be placed stationary beneath the withdrawal plates (FIGS. 5, 6) or installed for vertical movement in the gap defined by the edges being welded (FIGS. 7, 8).

When the bottom plate 10 (FIG. 5) is placed stationary, the elements 1 being welded are embraced at the place of their welding by the molding means. A welding electrode 15 is installed into the gap, defined by the edges being welded, from below through an aperture in the bottom plate. The space confined by the molding means and the edges of the elements 1 being welded is filled with the liquid slag 4, i.e. the slag bath is established, and then welding current is switched on by connecting a welding current source (not shown) to the electrode 15 and to the inlet pocket 6. Passing through the slag bath 4, welding current vigorously heats up the slag, which causes the electrode 15 and the edges being welded of the elements 1 to melt. The molten metal drops 3 float up in the slag 4, whose density exceeds that of the metal, to form the metal bath 5 on the slag surface. As the electrode 15 melts off, it is continuously fed in the upward direction into the slag bath 4. As the volume of the metal bath 5 (FIG. 6) grows, the excess slag 4 is removed from the gap through a passage 16, since the overall volume of the welding bath should remain unchanged in the course of welding. This technique of implementing the method requires no complex apparatus.

When a bottom plate 17 (FIG. 7) is installed for vertical movement, it is placed in the top portion of the gap defined by the edges being welded of the elements 1. The elements 1 being welded are embraced at the place of their welding by the molding means. The welding electrode 15 is installed into the gap, defined by the edges being welded, from below through an aperture in the bottom plate 17 so that the top end of the electrode 15 is disposed in the inner space of the inlet pocket 6. The inner space of the inlet pocket 6 is filled with the liquid slag 4. Welding current is switched on by connecting a welding current source (not shown) to the electrode 15 and to the inlet pocket 6. Passing through the slag bath 4, welding current vigorously heats up the slag, which causes the electrode and the edges being welded of the elements 1 to melt. The molten metal drops 3 float up in the slag 4, whose density exceeds that of the metal, to form the metal bath 5 on the slag surface. As the electrode 15 melts off, it is continuously fed in the upward direction into the slag bath 4. Since in the course of welding the surface of the metal bath 5 must remain at the same level while the volume of the slag bath 4 remains substantially unchanged, the bottom plate is continuously moved in the gap in the downward direction as the volume of the metal bath 5 grows. At the final stage of the process, the bottom plate 17 (FIG. 8) is moved downwards in the space confined by the withdrawal plates 9 and the molds 11 until the slag bath 4 and some volume of the metal bath 5, in which volume a shrinkage cavity can develop during crystallization of the weld, are completely withdrawn from the gap. This technique is recommended for welding long rectilinear joints.

In accordance with still another embodiment of the invention, the consumable welding electrode 2 (FIGS. 2, 3 and 4) is installed in the gap defined by the edges being welded of the elements 1 and the gap is filled with the welding flux 12 containing finely divided added metal (not shown). In this case the added material contained in the flux 12 melts concurrently with melting of the electrode 2 and of the flux 12.

The molten metal drops 3 float up in the slag 4, whose density exceeds that of the metal, and merge with the metal due to melting of the electrode 2 and of the edges being welded of the elements 1 to form a common metal bath 5. This technique provides for either increasing the efficiency or welding or alloying the weld, depending on the type of the adding metal. When alloying the weld, alloying components with a density less than that of the slag must be selected.

Figure 11:
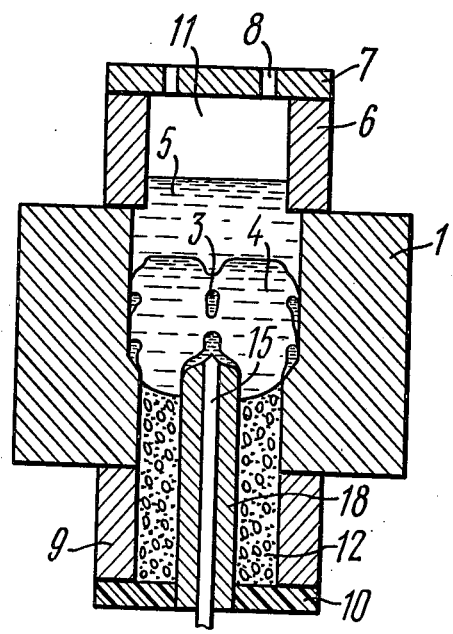
FIG. 11 illustrates an example of the welding with the use of a consumable nozzle through which an electrode wire is fed.

In accordance with still another embodiment of the invention, the bottom plate 10 (FIG. 11) is placed stationary beneath the withdrawal plates 9, and a consumable nozzle 18 is fixedly installed into the gap defined by the edges being welded of the elements 1 through the aperture in the bottom plate 10. The gap is filled with the welding flux 12 onto whose surface some amount of the liquid slag 4 is poured. The consumable nozzle 18 has longitudinal apertures (not shown) through which the electrode metal is fed into the slag bath in the form of the wires 15. A welding current source (not shown) is connected in this case to the consumable nozzle 18 and to the inlet pocket 6. The consumable nozzle 18, the electrode wires 15, and the edges being welded of the elements 1 melt in the course of welding. The molten metal drops 3 float up in the slag 4, whose density exceeds that of the metal, to form the metal bath 5. The volume of the welding flux 12 is in this case selected so that after melting and crystallization, with allowance made for shrinkage, it fills the space between the withdrawal plates 9. This technique is effective in welding curvllinear joints; the nozzle shape must in this case correspond to the profile of the gap defined by the edges being welded.

Figure 12:
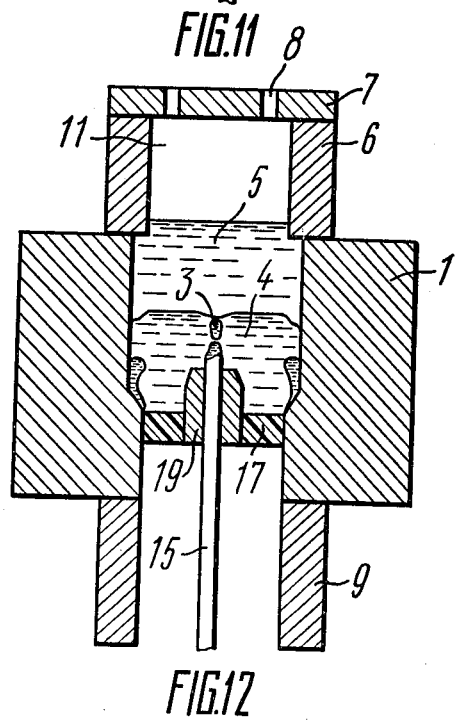
FIG. 12 illustrates an example of the welding with the use of a nonconsumable nozzle through which an electrode in the form of wire is fed.

In accordance with still another embodiment of the invention, the bottom plate 17 (FIG. 12) is placed for vertical movement in the top portion of the gap defined by the edges being welded of the elements 1, and a nonconsumable nozzle 19 is installed into the gap defined by the edges being welded through the aperture in the bottom plate 17 and fixed so that the top end of the nozzle 19 is disposed in the inner space of the inlet pocket 6. The nozzle 19 has longitudinal apertures (not shown) through which the electrode in the form of wires 15 are fed in the upward direction. The inner space of the inlet pocket 6 is filled with the liquid slag 4. Welding current is switched on by connecting a welding current source (not shown) to the nonconsumable nozzle 19 and to the inlet pocket 6. As the electrode wires 15 melt off, they are continuously fed in the upward direction into the slag bath 4. Since in the course of welding the surface of the metal bath 5 must remain at the same level while the volume of the slag bath 4 remains substantially unchanged, the bottom plate 17 jointly with the nonconsumable nozzle 19 is moved in the gap in the downward direction as the volume of the metal bath 5 grows. The process is continued till the gap becomes completely filled with the molten metal 5 and the slag bath 4 is withdrawn from the gap.

This embodiment of the invention allows welding current to be fed to the electrode immediately in the slag bath, which saves electric power. Besides, this technique is recommended for welding long joints.

Figure 13:
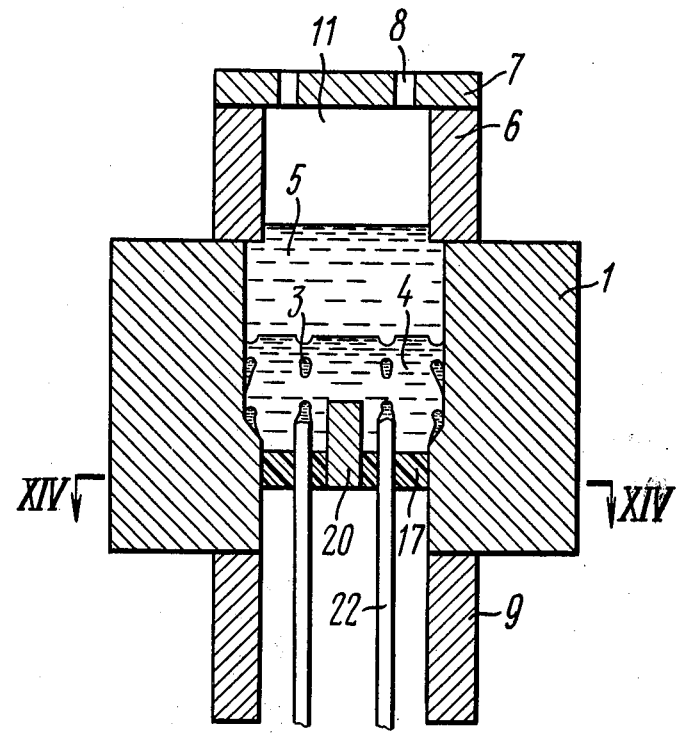
FIG. 13 illustrates an example of the welding by a nonconsumable electrode with the feed of added metal in the form of wire into the slag bath.
Figure 14:
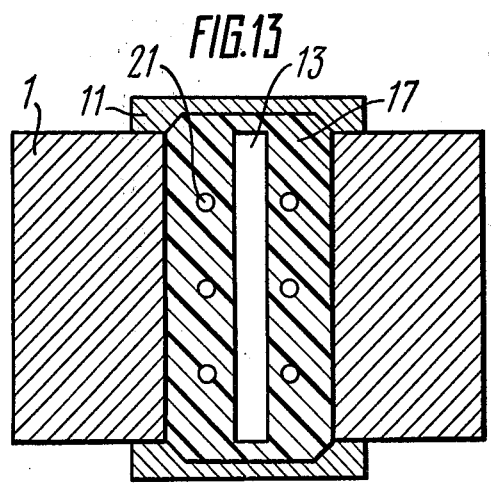
FIG. 14 is a sectional view taken along the line XIV—XIV in FIG. 13 and illustrating a bottom plate with through apertures for a nonconsumable electrode and for feeding added metal in the form of wire, the electrode and the added wire being not shown.

In accordance with still another embodiment of the invention, the bottom plate 17 (FIGS. 13, 14) is placed for vertical movement in the top portion of the gap defined by the edges being welded of the elements 1. The bottom plate 17 has the aperture 13 for installing therein a nonconsumable electrode 20, as well as apertures 21 for feeding an added metal in the form of wires 22 into the gap. The nonconsumable electrode 20 is secured in the bottom plate 17, and the added wires 22 are fed into the gap through the apertures 21. The inner space of the inlet pocket 6 is filled with the liquid slag 4. Welding current is switched on by connecting a welding current source (not shown) to the nonconsumable electrode 20 and to the inlet pocket 6; the current does not flow through the added material 22 which is outside the welding circuit. In the course of welding, as the added wires 22 melt off, they are continuously fed in the upward direction into the slag bath 4, and the bottom plate 17 is moved in the gap in the downward direction till the slag bath 4 is completely removed from the gap. This embodiment of the invention ensures welding of the elements with an intense heat removal owing to control, over a wide range, of the heat input consumed for the weld 1 m long.

When implementing all the above-described embodiments of the invention the slag density is selected in compliance with the relationship $$\gamma_{slag} = \frac{100}{\Sigma \frac{k_i}{\gamma_i}} > \gamma_m,$$

where:
$\gamma_{slag}$=density of slag;
$k_i$=percentage content of flux components;
$\gamma_i$=density of flux components.
$\gamma_m$=density of metal This allows proper selection of a flux for welding the metal in question.

The invention will be further described with reference to the following illustrative Examples.

EXAMPLE 1

Aluminum buses 1 (FIGS. 2, 3 and 4) of 160×300 mm in cross-section and of the following chemical composition (in weight percent): Mn, 0.01; Fe, 0.02; Si, 0.055; Cu, 0.0045; and Al, the balance, were welded using a flux of the NaF—AlF$_3$—CaF$_2$—SiO$_2$ system as the welding flux 12 according to U.S.S.R. Author's Certificate No. 207703. The elements 1 measuring 160×300×500 mm were placed onto withdrawal plates 9 secured on a bottom plate 10 of the molding means. A 160 mm wide plate electrode 2 was installed stationary in the gap defined by the edges being welded. An inlet pocket 6 of the molding means was placed onto the elements 1 being welded above the gap. Molds 11 were fastened at the sides of the edges being welded. The edges being welded were thus completely enclosed on all sides by the molding means elements, which prevented the slag bath from flowing out in the course of welding. The welding flux 12 with a grain size ranging from 2 to 10 mm was filled into the gap defined by the edges being welded. The welding process was started by pouring a liquid slag 4 onto the surface of the flux 12, following which a welding current source (not shown) was connected to the electrode 2 and to the inlet pocket 6. Filling the gap defined by the edges being welded by drops 3 of the molten metal from the welding electrode 2 and from the melting edges of the elements 1 being welded was accompanied by a continuous increase in the electrode gap, i.e. in the spacing between the plate electrode 2 and a metal bath 5. The process was terminated on complete melting of the welding electrode 2. The molding means was removed from the welded joint after the weld has fully crystallized. The process has yielded a weld free from defects and with a fair external shape. The weld joints were formed using the following flux composition and welding conditions:

welding flux (in weight percent): cryolite ($Na_3AlF_6$), 28; $CaF_2$, 64; $SiO_2$, 8; the flux density being $3.12^2/cm^3$;
no-load voltage of the transformer, V—44
current density at the electrode, $A/mm^2$—3 to 5
width of the gap between the edges being welded, mm—50
density of the metal being welded, $g/cm^3$—2.69

EXAMPLE 2

Elements 1 (FIGS. 5, 6) of a magnesium alloy were welded using a movable plate electrode with a stationary placed bottom plate of the molding means. The chemical composition of the metal being welded was as follows (in weight percent): Al, 4.3; Mn, 0.4; Zn, 1.0; Cu, 0.02; Mg, the balance.

Before starting the welding process, the molding means elements were installed on the edges of the elements being welded; the gap was closed at the sides by two molds 11, withdrawal plates 9 and a bottom plate 10 with an aperture for feeding an electrode 15 were placed beneath the gap, and an inlet pocket 6 was secured above the gap. The molding means elements were installed so as to prevent the liquid welding bath from flowing out in the course of welding, which was achieved by interposing asbestos sheets or cords between the mating surfaces of the elements 1 being welded and of the molding means. On completing the assembly, the welding electrode 15 was installed into the gap defined by the edges being welded, a liquid slag 4 was poured into the gap, and welding current was switched on. As the electrode 15 and the edges being welded melted, drops 3 of the molten metal from the electrode 15 fed into the gap and from the edges of the elements 1 being welded filled the gap between the edges. After the power source was disconnected from the welding circuit, weld metal crystallization and formation of the welded joint took place. When the weld had crystallized, the molding means was removed from the welded joint. Sound welded joints were formed using a welding flux of the following composition (in weight percent): cryolite ($Na_3AlF_6$), 28; $CaF_2$, 64; $SiO_2$, 8, and under the following welding conditions:

density of the metal being welded, $g/cm^3$—1.7;
density of the flux, $g/cm^3$—3.12;
cross-section of the elements being welded, mm—57×110
no-load voltage of the transformer, V—40
current density, $A/mm^2$—3.0
width of the gap between the edges being welded, mm—56
electrode feed rate, m/h—90

EXAMPLE 3

Commercial titanium elements of 60×500 mm in crosssection were welded employing a movable bottom plate 17 (FIGS. 7, 8) and a plate electrode 15 fed in the upward direction into a slag bath 4 through an aperture in the bottom plate 17.

Elements 1 being welded were placed onto withdrawal plates 9 of the molding means so as to make the bottom plate 17 moving in the downward direction occupy at the end of welding a position below that of the edges being welded. An inlet pocket 6 was installed onto the edges being welded, and the bottom plate 17 was disposed in the inlet pocket 6 so that the bottom plate could be subsequently withdrawn downwards, into the gap. The plate electrode 15 was installed into the gap through an aperture in the bottom plate 17. Welding was started by pouring a liquid slag 4 into the inlet pocket 6, following which a power source was switched on. The electrode 15 was fed through the aperture in the bottom plate 17 into the slag bath 4 at a rate sufficient for maintaining a constant electrode spacing. In the course of welding, the bottom plate 17 was moved downwards into the gap with concurrently feeding the plate electrode 15 upwards. Such a movement of the bottom plate 17 and the electrode 15 with respect to each other made it possible to maintain a constant volume of the slag bath 4.

Sound welded joints were produced using a welding flux containing (in weight percent): cryolite, 5; PbCl, 70; $CaF_2$, 5; $BaF_2$, 20 and under the following welding conditions:

density of the metal being welded, $g/cm^3$—4.5;
density of the flux, $g/cm^3$—5.16;
no-load voltage of the transformer, V—36
current density at the electrode, $A/mm^2$—4.0
plate electrode feed rate, m/h—90
cross-section of the elements being welded, mm—60×500
welding time, min—2.5

EXAMPLE 4

Subjected to welding was a deformable aluminum based alloy, unstrengthenable by heat treatment, of the following chemical composition (in weight percent): Mg, 6.29; Mn, 0.56; Si, not more than 0.01; Fe, not more than 0.01; Ti, 0.05; Cu, not more than 0.01; and Al, the rest. A $NaF—AlF_3—CaF_2—SiO_2$ slag system according to U.S.S.R. Author's Certificate No. 207703 was used as flux. A consumable nozzle 18 split axially into two parts each having longitudinal slots was installed into the gap defined by the edges being welded; when joined these two parts formed the nozzle 18 with longitudinal passages serving to feed electrode wires 15 through the nozzle. The elements 1 being welded were embraced by a molding means at the welding location. A bottom plate 10 was in this case placed stationary beneath the gap. The consumable nozzle 18 was introduced into the gap defined by the edges being welded through apertures in the bottom plate 10. The electrode wires 15 were introduced into the passages in the consumable nozzle 18. On completing said operations, the molding means elements and the elements being welded were brought into a close mating relationship by sealing the clearances therebetween with asbestos. A welding flux 12 was filled into the gap defined by the edges being welded. The consumable nozzle 18 was connected to one pole of a power source (not shown), and the inlet pocket 6, to the other. The welding process was started by pouring a liquid slag 4 over the surface of the flux 12 filled into the gap, following which the welding circuit was switched on. The welding process was controlled from the voltmeter and ammeter readings under the following conditions:

welding flux (in weight percent): cryolite, 28; $CaF_2$, 64; $SiO_2$, 8; the flux density being 3.12 $g/cm^3$;
no-load voltage of the transformer, V—44
current density at the electrode, $A/mm^2$—4.0
cross-section of the elements being welded, mm—50×500
density of the metal being welded—2.55 $g/cm^3$ width of the gap between the edges being welded, mm—60 welding speed, m/h—30

EXAMPLE 5

A 50 mm thick metal was welded, whose chemical composition was as follows (in weight percent): Mg, 4.8; Mn, 0.54; Fe, 0.25; Zn, 0.04; Si. 0.1; Cu, 0.075; and Al, the rest.

The edges to be welded of elements 1 (FIG. 13) of 50×250 in cross-section were embraced by a molding means; an inlet pocket 6 was placed above the gap; withdrawal plates 9 and a bottom plate 10 with apertures for feeding adding material in the form of a wire 22, beneath the gap; and the side faces of the edges being welded were embraced by molds 11. A nonconsumable graphite electrode 20 in the form of a plate was secured to the bottom plate 10. The process was started by pouring a liquid slag 4 into the gap, followed by connecting one pole of a power source (not shown) to the graphite electrode 20, and the other pole, to the inlet pocket 6. The added wire 22 not connected in the welding circuit was fed into the slag bath 4 in the upward direction through the apertures in the bottom plate 10 and melted in the liquid slag bath 4. Since the graphite electrode 20 did not react with the molten slag 4, the electrode spacing could be maintained constant. As a result, a weld free of defects and with a fair external shape was produced.

Used in the welding was flux according to U.S.S.R. Author's Certificate No. 207703, of the following composition (in weight percent): cryolite, 28; $CaF_2$, 64; $SiO_2$, 8.

The conditions in this example were as follows:
density of the flux, $g/cm^3$—3.12
density of the metal being welded—2.6
no-load voltage of the transformer, V—40
current density at the electrode, $A/mm^2$—2.5
width of the gap between the edges being welded, mm—64

While particular embodiments of the invention have been shown and described, various modifications thereof will be apparent to those skilled in the art, and therefore it is not intended that the invention be limited to the disclosed embodiments or to the details thereof and departures may be made therefrom within the spirit and scope of the invention as defined in the following claims.

What is claimed is:

1. A method for electroslag welding of metal edges comprising the following steps: installing an electrode in a gap defined by the metal edges to be welded and filling said gap with welding flux having a density higher than the density of the metal to be welded, forming a slag bath on the surface of the welding flux, passing welding current through said slag bath and melting down therein said electrode, with the weld being formed in the downward direction by the molten metal floating up in the molten slag, and protecting the molten metal from the atmosphere.

2. A method as defined in claim 1, wherein said electrode is fixedly installed in a vertical position between the edges being welded, the gap defined by the edges being welded is filled with welding flux, and the process is started by establishing a slag bath near the upper end of the electrode, the volume of the electrode being selected equal to that of the space confined by the edges being welded.

3. A method as defined in claim 2, wherein a consumable welding electrode is installed in the gap defined by the edges being welded, which is followed by filling the gap with welding flux containing a finely divided added material.

4. A method as defined in claim 1, wherein the welding is effected by feeding a consumable electrode in the upward direction within the space confined between the edges being welded.

5. A method as defined in claim 4, wherein any excess volume of the slag in the course of welding is removed from the gap defined by the edges being welded.

6. A method as defined in claim 4, wherein the slag bath is moved in the downward direction in the course of welding.

7. A method as defined in claim 1, wherein in the gap between the edges being welded is fixedly installed a consumable nozzle through which an electrode is fed into the slag bath.

8. A method as defined in claim 1, wherein in the gap between the edges being welded is fixedly installed a nonconsumable nozzle through which an electrode is fed into the slag bath through the nozzle.

9. A method as defined in claim 1, wherein in the gap between the edges being welded is installed a nonconsumable electrode and the slag bath is fed with an adding material being outside the welding circuit.

10. A method as defined in claim 1, wherein the gap defined by the edges being welded is filled with welding flux and the process is initiated by pouring some amount of a liquid slag on the surface of the welding flux.

11. A method as defined in claim 1, wherein the slag density is determined by the formula:

$$\gamma_{slag} = \frac{100}{\sum \frac{k_i}{\gamma_i}} > \gamma_m,$$

where
$\gamma_{slag}$ = density of slag;
$k_i$ = percentage content of flux components;
$\gamma_i$ = density of flux components
$\gamma_m$ = density of the metal.

* * * * *